(12) United States Patent
Kyle et al.

(10) Patent No.: US 11,122,066 B2
(45) Date of Patent: Sep. 14, 2021

(54) CYBER SECURITY ENHANCED MONITORING

(71) Applicant: JPMorgan Chase Bank, N.A., New York, NY (US)

(72) Inventors: Mackenzie Kyle, New York, NY (US); Benjamin Arnold, New York, NY (US); Bradley N. Gunner, Hoboken, NJ (US); Rohith Kondeti, Jersey City, NJ (US); Michael Monte, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 417 days.

(21) Appl. No.: 16/142,283

(22) Filed: Sep. 26, 2018

(65) Prior Publication Data

US 2019/0098036 A1 Mar. 28, 2019

Related U.S. Application Data

(60) Provisional application No. 62/563,351, filed on Sep. 26, 2017.

(51) Int. Cl.
*H04L 29/06* (2006.01)
*H04L 12/26* (2006.01)
*G06F 21/55* (2013.01)
*H04L 12/24* (2006.01)

(52) U.S. Cl.
CPC ........ *H04L 63/1425* (2013.01); *G06F 21/552* (2013.01); *H04L 41/0893* (2013.01); *H04L 43/065* (2013.01); *H04L 63/0227* (2013.01); *H04L 63/101* (2013.01)

(58) Field of Classification Search
CPC .............................. H04L 63/1425; G06F 21/50
See application file for complete search history.

(56) References Cited

U.S. PATENT DOCUMENTS

| | | | | |
|---|---|---|---|---|
| 6,347,374 | B1* | 2/2002 | Drake | G06F 21/554 709/224 |
| 6,671,811 | B1* | 12/2003 | Diep | G06F 21/552 709/223 |
| 9,292,695 | B1 | 3/2016 | Bassett | |
| 2002/0133594 | A1* | 9/2002 | Syvanne | H04L 63/0263 709/226 |
| 2002/0133721 | A1* | 9/2002 | Adjaoute | G06Q 20/4016 726/23 |
| 2002/0138416 | A1* | 9/2002 | Lovejoy | G06Q 10/06 705/38 |
| 2004/0117478 | A1* | 6/2004 | Triulzi | H04L 63/1416 709/224 |

(Continued)

OTHER PUBLICATIONS

"Use Case", https://en.wikipedia.org/wiki/Use_case, 16 pages, last edited: May 1, 2021. (Year: 2021).*

(Continued)

*Primary Examiner* — Ponnoreay Pich
(74) *Attorney, Agent, or Firm* — Greenblum & Bernstein, P.L.C.

(57) ABSTRACT

Systems for and methods of detecting cyber-attacks by selecting a group of users and monitoring those user's computer systems for behavior that indicates a series of actions reflecting behavior indicative of a cyber-attack.

18 Claims, 7 Drawing Sheets

(56) References Cited

U.S. PATENT DOCUMENTS

| | | | |
|---|---|---|---|
| 2006/0034305 A1* | 2/2006 | Heimerdinger | H04L 63/1408 |
| | | | 370/408 |
| 2014/0201836 A1 | 7/2014 | Amster | |
| 2016/0014147 A1 | 1/2016 | Zoldi et al. | |
| 2017/0063900 A1* | 3/2017 | Muddu | H04L 63/20 |
| 2017/0250868 A1* | 8/2017 | Keeney | H04L 41/0816 |
| 2019/0098036 A1* | 3/2019 | Kyle | H04L 63/101 |

OTHER PUBLICATIONS

International Search Report and Written Opinion from PCT/US2018/052812 dated Nov. 30, 2018.

\* cited by examiner

CYBER SECURITY ENHANCED MONITORING

CROSS REFERENCE TO RELATED APPLICATIONS

This application claims priority to U.S. Provisional application 62/563,351 filed on Sep. 26, 2017 which is incorporated herein by reference in its entirety.

TECHNICAL FIELD

The present invention relates generally to detecting cyber-attacks directed against a group within a larger organization, and more particularly to security monitoring that does not require predetermined signature libraries in order to detect attacks.

BACKGROUND

Cyber-attacks are increasingly frequent and can result in significant negative impact to individuals and organizations. In addition to the increasing frequency, cyber-attacks are becoming more sophisticated, often targeting specific individuals or groups within an organization. Known methods of detecting these attacks involved monitoring the computers of these individuals or groups for the presence of program or data files associated with previously identified malicious software (malware). Other known methods involve monitoring specific areas in the memory of these computers to detect changes associated with malware. Both of these methods are hardware intensive and rely on the detection of previously identified malware. Thus, such methods may reduce the performance of a computer system and are at risk of failing to detect new malware variants. What is needed is a method of detecting cyber-attacks that does not significantly impact the performance of a monitored computer and does not require detection algorithms that search for a particular attack or that the attacking software be previously encountered.

SUMMARY

Exemplary embodiments of the present invention comprise methods of detecting cyber-attacks by monitoring the behavior of a computer belonging to an at-risk user or group. Some exemplary embodiments rely on a predictable behavior of a cyber-attack (i.e., a Kill Chain Methodology) in order to detect a suspected attack and provide an alert. In one such exemplary embodiment, a predetermined group of computers are monitored to detect the occurrence of a predefined triggering event. Once a triggering event is detected, the method monitors the group of computers in order to detect a series of behaviors that are consistent with an ongoing cyber-attack.

In order to manage the amount of data monitored and recorded by an exemplary embodiment of the invention, likely targets of a cyber-attack are pre-identified based upon factors that would make the targets particularly attractive for such an attack. With likely targets having been identified, use cases are applied to detect computer system behaviors consistent with a probable cyber-attack. Once such behaviors are detected, an alert or other notification is provided to a party responsible for monitoring and investigating potential computer system threats.

BRIEF DESCRIPTION OF THE DRAWINGS

These and other features and advantages of the present invention will become better understood with regard to the following description and accompanying drawings in which.

DETAILED DESCRIPTION

Figure 1:
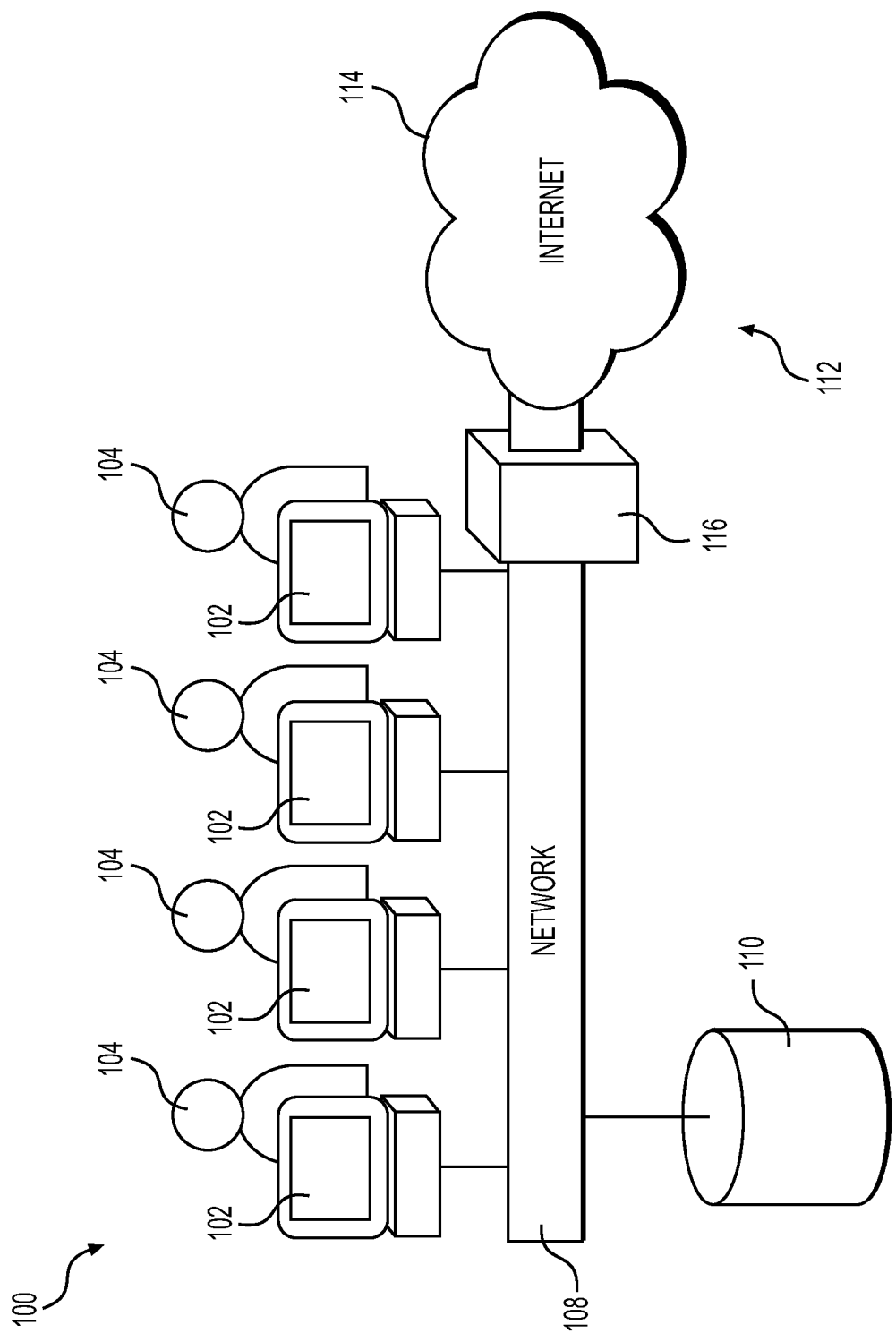
FIG. 1 represents an exemplary computer network.

FIG. 1 represents an exemplary computer system 100 that includes a plurality of computers 102 that are assigned or available to users 104 within an organization. Connecting computers 102 is a network 108. The network may be in communication with various services such as printers (not shown) and storage 110. As illustrated at 112, the network 108 will typically be connected to the Internet 114. Such connections may be equipped with protective systems 116 that attempt to provide some protection against external cyber-threats. Unfortunately, these cyber-threats are becoming increasingly sophisticated and often target individual users 104 or groups of users 104. In certain cyber-attacks, these groups and users are those that are identified as having access to organizational assets or capabilities that the cyber-threat desires to gain access to, or otherwise exploit. For example, the targeted group or user may be responsible for sensitive data or have access to financial records. Cyber-attacks generally follow a series of steps that can be categorized using a defined process known as a "Kill Chain." These steps are generally: identify the user or group of users that the attacker desires to target; develop a method of attack expected to gain access to the assets or capabilities targeted by the cyber threat; deliver the attack, i.e., exploit the user or group to install the attacking method, communicating with an external source to receive instructions or deliver information; and attempt to perform actions designed to damage or steal information or assets from the organization. Embodiments of the invention utilize these expected Kill Chain steps to detect attacks.

Figure 2:
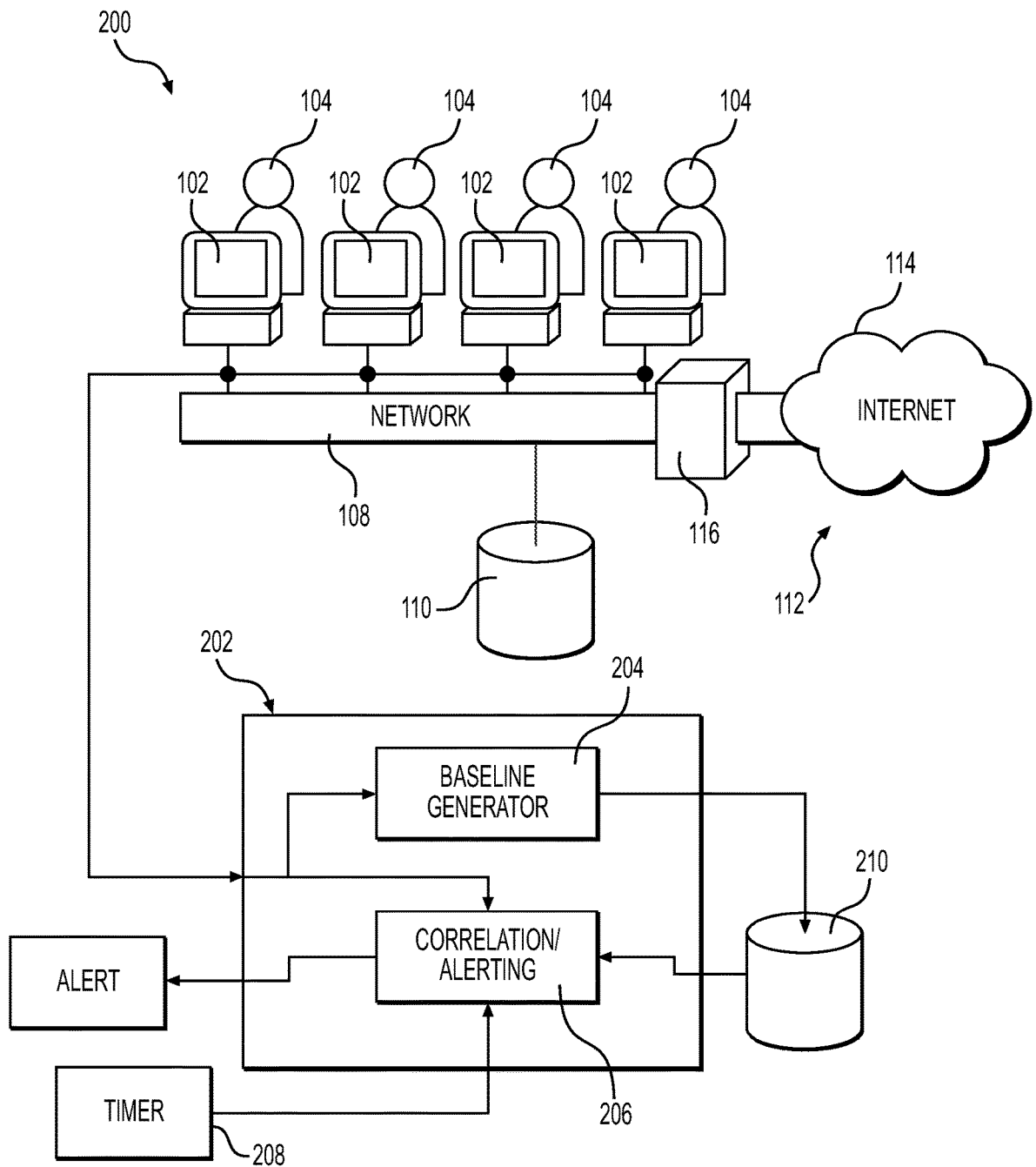
FIG. 2 illustrates a system for detecting cyber-attacks, according to an exemplary embodiment of the invention.

FIG. 2 illustrates the computer system of FIG. 1 further configured to form a security monitoring system 200, according to an exemplary embodiment of the invention. A baseline generation and monitoring system is illustrated at 202. As shown, the baseline generating and monitoring system 202 comprises a baseline generator 204, a correlation/alert generator 206, and a timer 208. The system 200 is in communication with a baseline storage database 210. However, other embodiments of the system 200 may be configured such that the database 210 is internal to the baseline generating and monitoring system 202.

Figure 3:
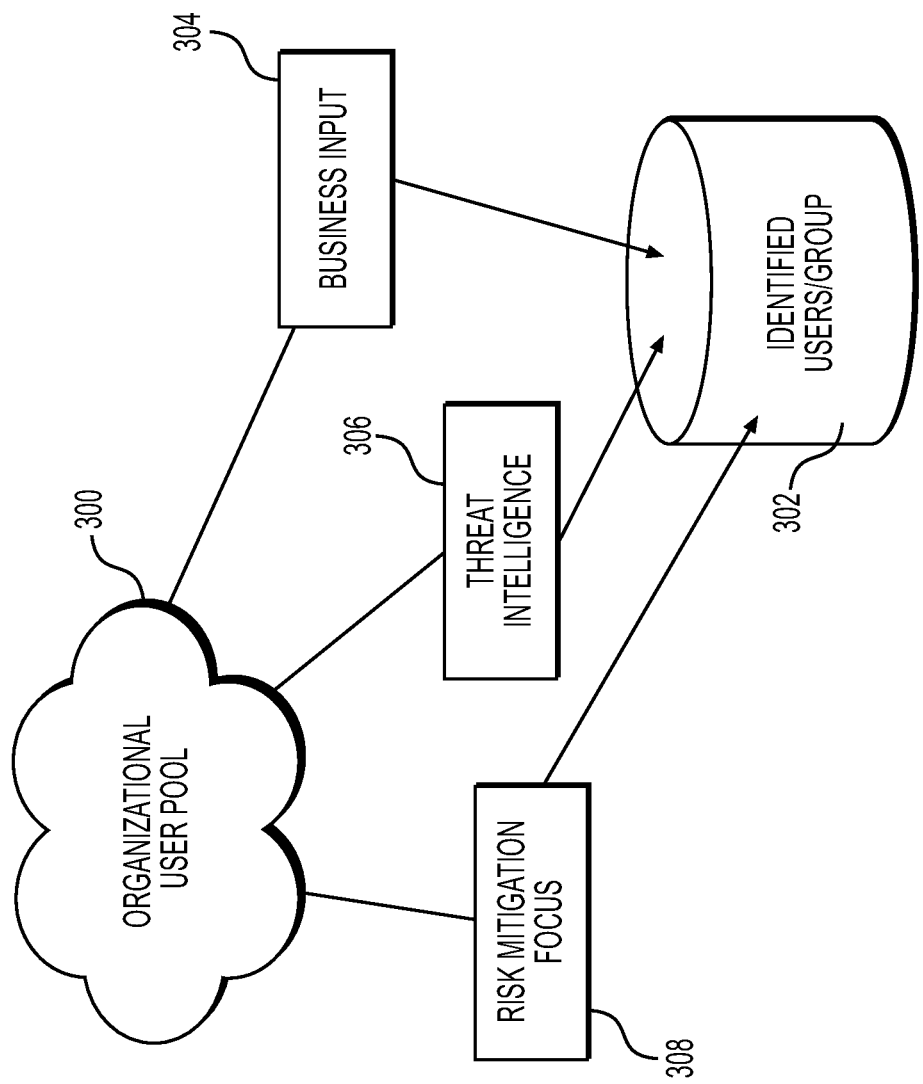
FIG. 3 illustrates data flow within a system to implement a process of identifying a group of users for monitoring, according to an exemplary embodiment of the invention.

In an exemplary embodiment of the invention, a group of users 104 which comprises at-risk users is identified. Typically, this group will be a subset of the total organizational user pool 300. As illustrated in FIG. 3, a sample of users 302 is identified using three primary sources. The first source 304 is internal to the risk mitigation group responsible for implementing the invention (e.g., the system 200). The risk mitigation group identifies potential cyber-attack targets by determining what type of people, assets, or infrastructure needs to be monitored in more detail. The risk mitigation group might also consider criticality, classification, or the risk level of potential targets in the organization so as to identify targets for monitoring by embodiments of the invention. As illustrated in FIG. 3, threat intelligence may be used as a second source 306 to assist in the identification of potential cyber-attack targets. The second source 306 comprises extra-organizational information and is used to identify those targets that may have been identified to the public as the result of their role or from various public disclosures. The second source 306 also comprises publicly available information that discloses recent attacks targeting infrastructure or business processes that are maintained by the organization and its commercial peers. This publicly available information may be used by risk mitigation groups to identify at-risk targets. For example, the publicly available information can be reviewed for disclosures that might disclose to a cyber-attack source, those individuals or groups within the organization that are responsible for particularly sensitive information. These individuals or groups can then be selected for monitoring. A third source 308 may be used to identify those users or groups that may be particularly susceptible for cyber-attack targeting.

Once the individual user 104 or groups of users 104 are identified, cyber-attack use cases are developed. These use cases are developed by considering the Kill Chain Methodology described herein. The Kill Chain Methodology refers to a series of steps that are often completed as part of the preparation and execution of an attack on an individual or group. As described herein, the Kill Chain Methodology steps have been modified to be particularly applicable to a cyber-attack. In particular, use cases are developed for the steps of delivering the attack, installing the attacking method, communicating with an external source to receive instructions or deliver information, and attempting to perform actions that provide the desired results to the cyber attacker.

To better understand how the Kill Chain Methodology can be used by the invention to detect a cyber-attack, various use cases will be examined in detail. In an exemplary embodiment, the use case for the step of delivering the attack considers email communications to a member of an identified at-risk group. The use case may identify an email as being an attacker attempting to deliver malicious software code to a target. The use case may then consider actions such as monitoring emails sent to the at-risk group from a new sending email address, a new sending domain, or with an attachment type that hasn't been encountered before by the monitoring system. Thus, according to the use case, the detection of any of these use case scenarios may indicate an initial phase of a potential attack. However, it is not uncommon for a user to receive an occasional email from a new address or to receive an attachment that hasn't been received by the user or group before. Thus, an exemplary embodiment leverages the Kill Chain Methodology to identify what additional actions may be indicative of an ongoing cyber-attack and will monitor for additional suspect actions using additional use cases based on other Kill Chain Methodology steps.

Suspect actions may comprise installation, communication, or actions that are intended to provide the information or result desired by the attacking party. Thus, in an exemplary embodiment of the invention, use cases are developed for the installation step of the Kill Chain Methodology. Such use cases monitor for such occurrences as the creation of a new process, the installation of a new service or program, or a register modification that takes place on a computer associated with a member of the at-risk group.

Other use cases may include the Command and Control step of the Kill Chain Methodology. In this or similar use cases, outgoing communications from computer systems associated with a user or group of users may be monitored for occurrences of such things as new proxy connections, new user agents, or the establishment of new user connections. Other use cases may include suspect actions that indicate that an attacker is attempting to leverage a breach created by malicious software or the theft of user credentials. For example, such a use case may monitor such actions as a new source authorization, a new attempted access, or a new outbound data connection.

Notwithstanding the examples provided herein, other use cases may be developed and implemented depending on the persons, assets, and infrastructure to be monitored, as well as the nature of the attacks to be prevented.

Figure 4:
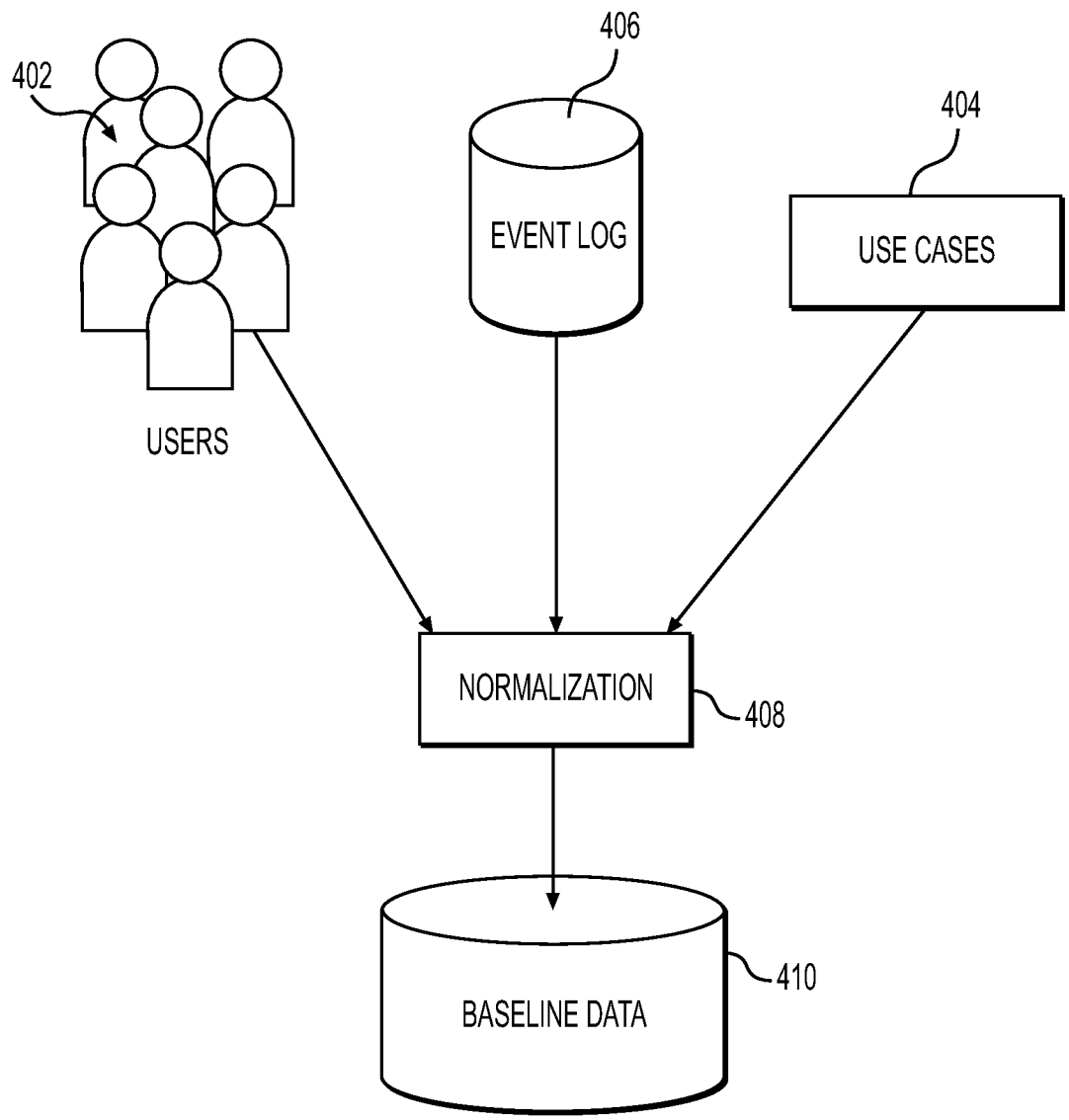
FIG. 4 illustrates data flow within a system to implement a process to create baseline data according to an exemplary embodiment of the invention.

Once use cases have been developed for a particular at-risk group, a baseline for each use case can be developed. As is illustrated in FIG. 4, a baseline is developed by combining the list of the members of a particular group 402, use cases 404 as described herein that include triggering events, and an event log 406 that comprises events that might include the triggering events. For example, if the use case 404 indicates that a triggering event is the receipt of an email from an address not previously encountered by a member of the group, the event log 406 may include a listing of all email addresses from which emails were previously received by members of the group 402. This information is normalized 408, stored in a data store 410, and searched to identify behavior that is "normal" or baseline for the particular group. In an exemplary embodiment of the system 200, "normalized" refers to a process of analyzing data that takes into account the frequency, volume, and other characteristics of data associated with the various data sources such that a data sources that differ from the norm (for example, are larger or smaller than the majority) do not unduly influence the resulting baseline. The result is a list comprising normal behaviors and activities of the group (a master whitelist) that can be applied to the type of events considered by the use case. Such a master whitelist is created for each use case. For example, in the currently described embodiment of the system 200, these whitelists include a list of emails addresses recognized by the group 402, a list of installations performed on systems associated with members of the particular group, a list of communications performed by systems associated with members of the particular group, and a list of actions performed by systems associated with members of the particular group.

Figure 5:
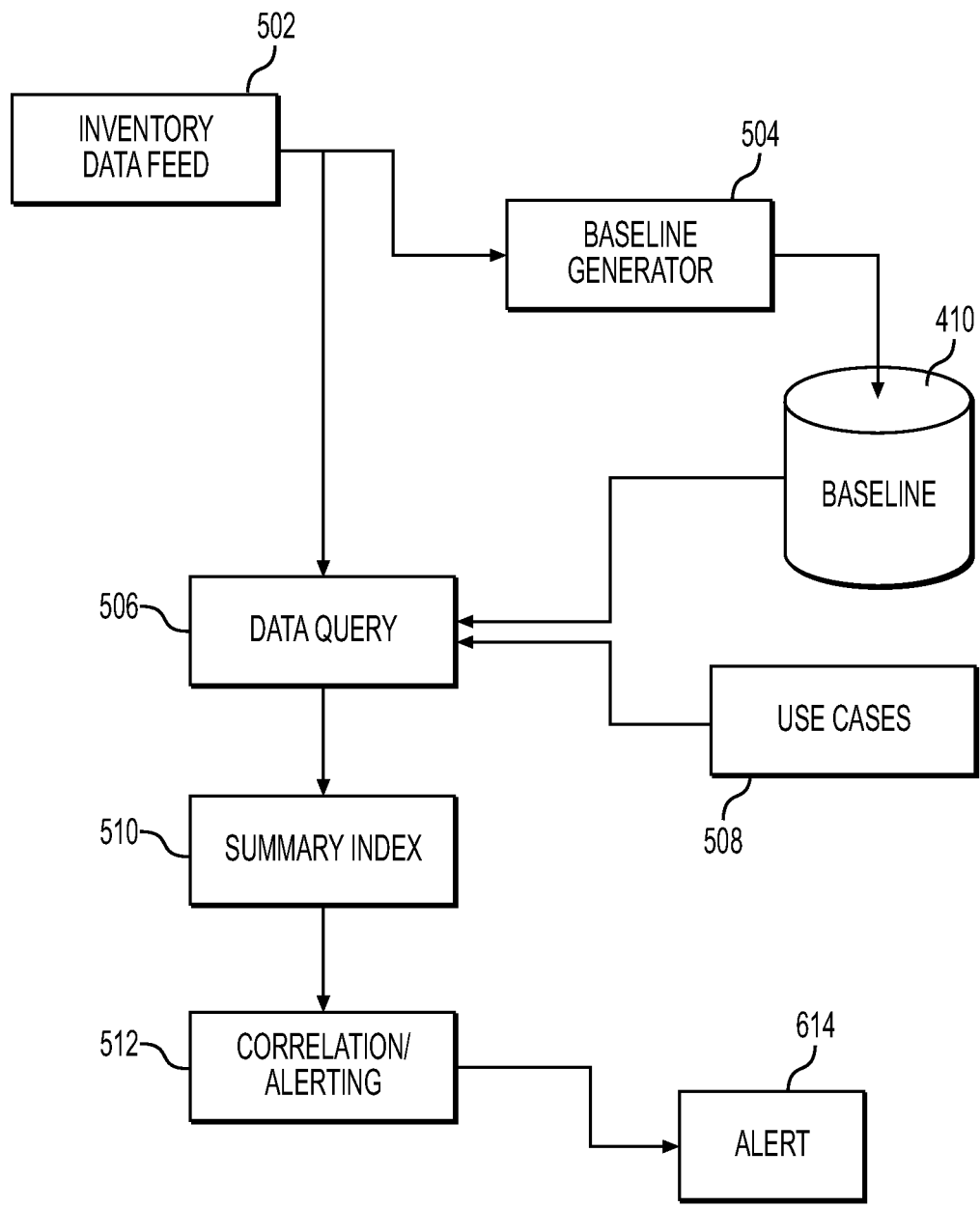
FIG. 5 is a data flow diagram illustrating the delivery of an inventory feed to a baseline generator and correlation/alerting function, according to an exemplary embodiment of the invention.

As is illustrated in FIG. 5, in an exemplary embodiment of the system 200, an inventory data feed 502 is provided to a baseline generator 504 which performs the functions illustrated in FIG. 4. In this manner, the baseline for the activities being monitored may be constantly updated with new information from the inventory data feed 502. This updating allows the baseline or whitelist to take into account new behavior that is benign in nature. For example, if the particular group were to deploy a new software tool, members of the group may receive emails from the software vendor providing this tool and software access information. These will appear as new mails from an unfamiliar source, which could indicate a cyber-attack. However, in this example, it will be determined that these emails are normal baseline behavior in light of the new software tool and associated email. Thus, by continuously updating the baseline data with incoming data, the baseline data will reflect up-to-date group baseline behavior.

In addition to providing data to the baseline generator 504, the inventory data feed 502 is subject to a data query process 506 which compares the inventory data feed to the output of the baseline generator 504. If the data query process 506 detects an event that is not found on the whitelist 410, the event is compared to the use cases 508 developed by considering the Kill Chain Methodology as described herein. If a detected event satisfies the conditions of a use case, the event and an identification of the computer that exhibited the behavior that triggered the use case may be recorded in a summary index 510 for further monitoring.

Figure 6:
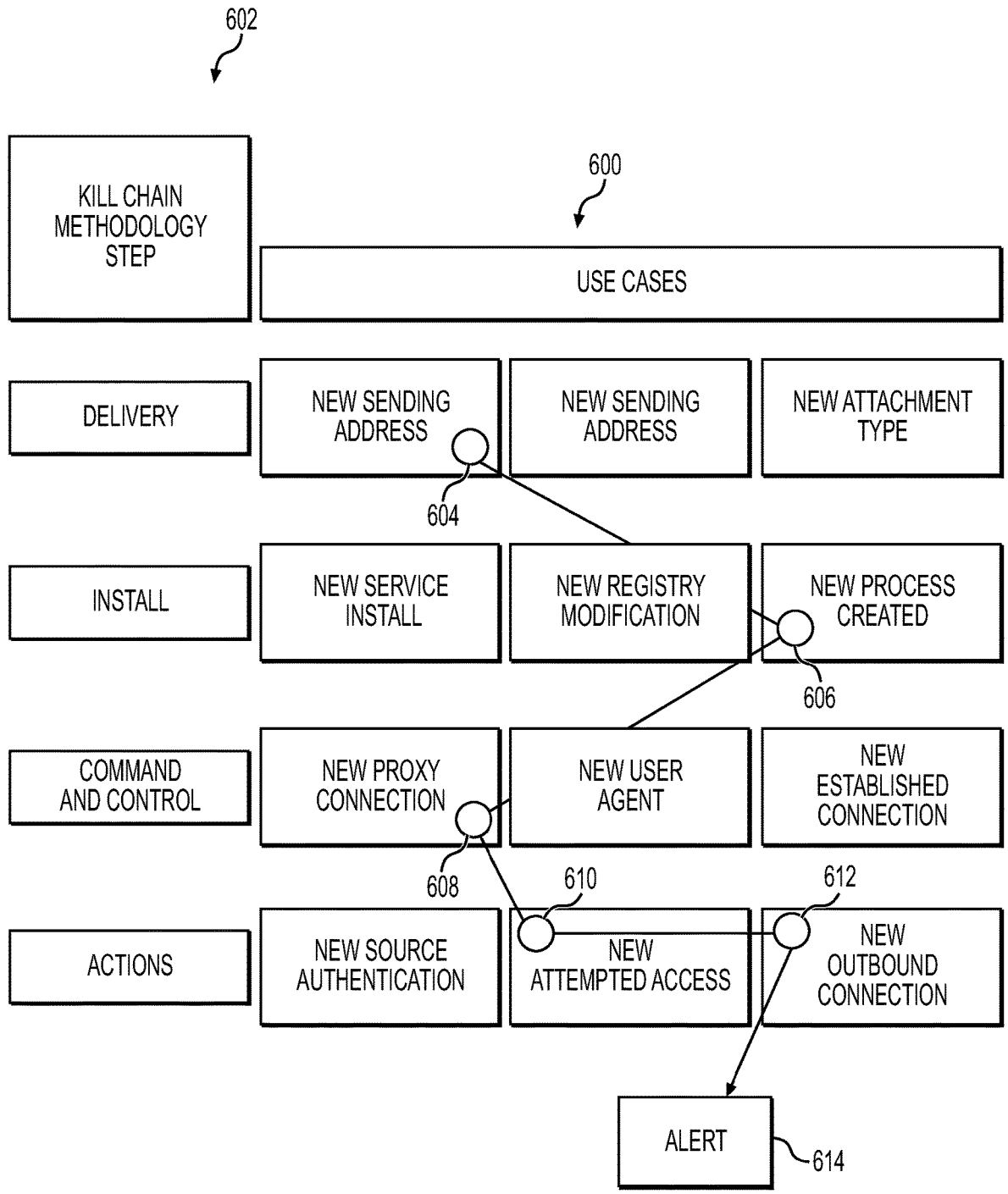
FIG. 6 is a diagram of an exemplary monitoring system detecting a cyber-attack.

A correlation/alerting process 512 is applied to the summary index data 510. An exemplary embodiment of the correlation/alerting process 512 is illustrated in FIG. 6. The process 512 uses various use cases 600 that correspond to the Kill Chain Methodology 602. When an event in the summary index data 510 satisfies a use case 604 corresponding to the "delivery" step, that event is logged by the correlation/alerting process 512. The correlation/alerting process 512 then monitors the remaining use cases 606-612. If an event in the index data satisfies one or more of these remaining use cases 606-612, an alert is generated 614. Embodiments of the invention may require greater than a certain number of use cases be satisfied within a predetermined time period. As shown in FIG. 6, a "delivery" use case is detected by receipt of an email from a new address 604. In a cyber-attack, the attacker may initiate the creation of a new process 606 on the user computer being attacked, thereby satisfying the "install" use case. The "command and control" use case may be identified by the creation of a new proxy connection 608. The "actions" use case may be satisfied by a new attempted access 610 and a new outbound data connection 612 being initiated. Each use case may have a plurality of conditions which satisfy the use case. As such, there are a plurality of combinations of detected events that will result in an alert being generated. In certain exemplary embodiments, more than one Kill Chain Methodology step must be satisfied before an alert 614 is generated. However, in other embodiments, a single Kill Chain Methodology step that is satisfied by a plurality of use case instances will generate the alert 614. In addition to the various combinations of Kill Chain Methodology step use cases that are satisfied to generate an alert, some exemplary embodiments may also require that the satisfaction of the Kill Chain Methodology steps and use cases occurs within a predetermined period of time. For example, in one such exemplary embodiment, use cases representing three steps of the Kill Chain Methodology must be satisfied within a 48-hour period before the alert 614 is generated, while in another exemplary embodiment, an alert is generated if the three use cases are satisfied over a longer period, such as 7 days. These time periods and combinations of use cases are merely examples. One of ordinary skill in the art will appreciate that other embodiments of the invention may have different combinations of time periods and use cases that result in the generation of the alert 614.

Figure 7:
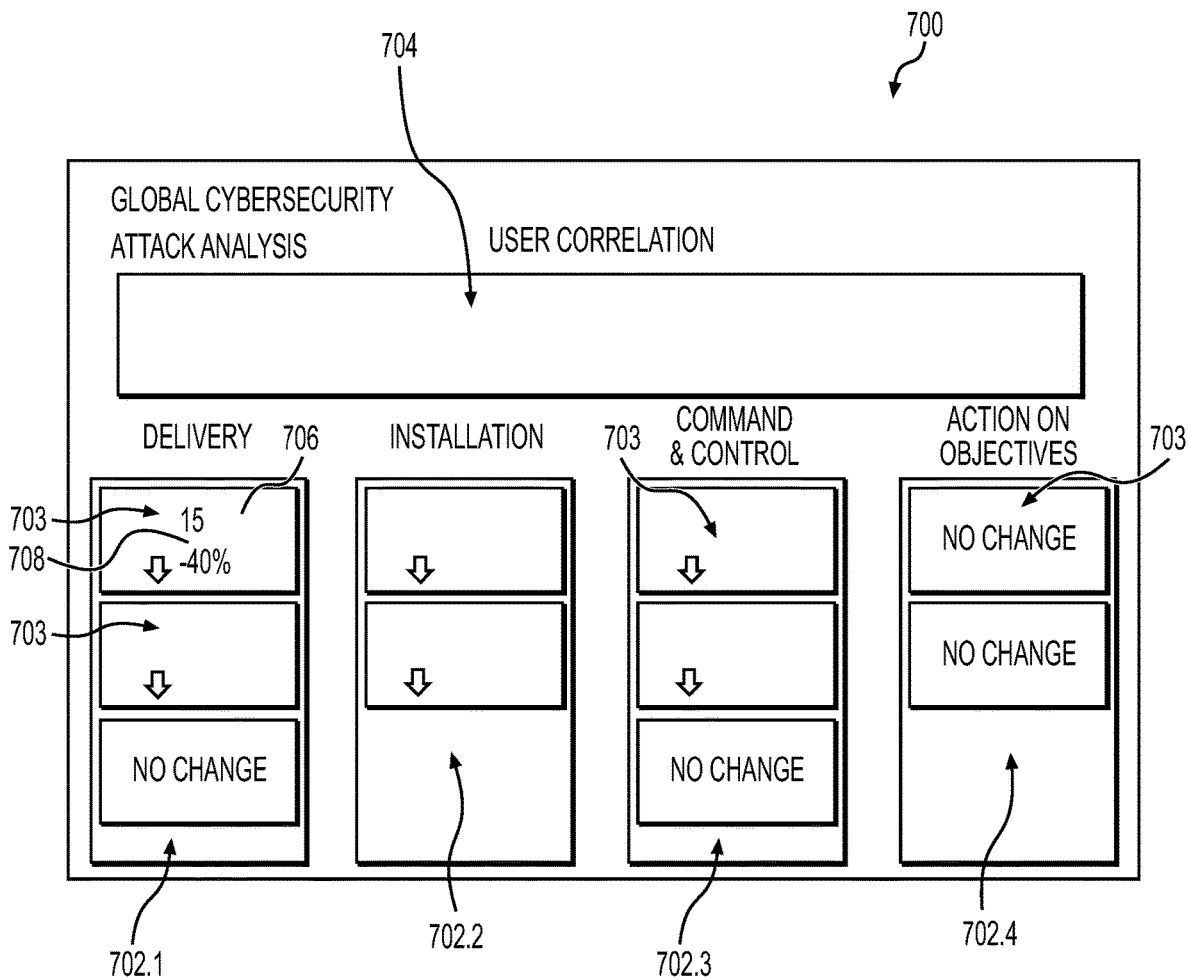
FIG. 7 is a user interface of the system of FIG. 6, according to an exemplary embodiment of the invention.

In some embodiments, an alert generated by the correlation/alert generator 206 comprises a summary of the satisfied use cases along with information indicating the data that triggered each particular use case. For example, such a summary may comprise a list of use cases and the number of time that they were satisfied by detected events. Such information allows security administrators or computer users to track suspect activity and take actions as are deemed necessary. A user dashboard 700 may display data related to the various use case groups 702.1-702.4 and corresponding counts 703 of satisfied use cases. The dashboard 700 may provide correlation data 704 arranged by user to highlight suspected cyber-attack activity directed against the monitored users and user groups. To illustrate trending behavior, the user dashboard 700 presents an indication of changes in the occurrence of activities that satisfy use cases. For example, in the illustrated user dashboard 700, there is an indication of 15 occurrences of emails received from a new sending domain 706. As shown at 708 in FIG. 7, this number represents a 40% decrease in such deliveries since a last measuring period. Such changes permit users to identify and investigate changes in activity by use case in order to detect possible cyber-attacks. Exemplary embodiments of such a user dashboard 700 may also include inventory feed data and various alert indictors that serve to highlight the possibility that a cyber-attack may be underway.

While the present invention has been illustrated by the description of exemplary embodiments thereof, and while the exemplary embodiments have been described in considerable detail, it is not the intention of the Applicant to restrict or in any way limit the scope of the invention to such detail. For Example, the specific uses cases illustrated are not intended to be limiting and one ordinarily skilled in the art will understand that the use cases used by various implementations of the invention are dependent upon the specific systems being monitored. It is sought, therefore, to cover all such use cases as fall within the spirit and scope of the general inventive concepts, as described herein, and equivalents thereof. Additional advantages and modifications will readily appear to those skilled in the art. Moreover, elements described with one embodiment may be readily adapted for use with other embodiments. Therefore, the invention, in its broader aspects, is not limited to the specific details, the representative apparatus, and illustrative examples shown and described. Those skilled in the art will also find apparent various changes and modifications to those embodiments illustrated. Accordingly, departures may be made from such details without departing from the spirit or scope of the general inventive concepts.

What is claimed is:

1. A system for detecting behavior associated with a potential security breach of an enterprise, the system comprising:
   a computing device;
   a network in communication with the computer device;
   a baseline generation and monitoring system in communication with the network;
   a correlation and alert generator in communication with the network; and
   a memory storing instructions that when executed, cause the baseline generation and monitoring system to:
      identify, from an employee pool, an employee of the enterprise that represents an elevated risk of contributing to the potential security breach where the computing device is associated with the employee, the employee pool including a plurality of enterprise employees;
      develop a plurality of use cases based on the identified employee by using a cyber-attack methodology, the cyber-attack methodology relating to a sequence of actions that are completed to prepare for a cyber-attack and to execute the cyber-attack;
store a list of predetermined behaviors corresponding to the plurality of use cases that are indicative of the potential security breach;
determine a baseline for each of the predetermined behaviors in the list;
monitor the computing device associated with the identified employee for occurrence of a first behavior that exceeds the corresponding baseline;
monitor the first behavior of the computing device for an occurrence of a second behavior that is related to the first behavior; and
generate an alert using the correlation and alert generator when both the first behavior and second behavior occurs.

2. The system of claim 1, wherein the baseline generation and monitoring system is further configured to determine the elevated security risk based on criticality of the employee, extra-organizational threat intelligence, and input from an organization of which the employee is a member.

3. The system of claim 1, further comprising an event log which stores a history of computing device activity.

4. The system of claim 3, further comprising instructions that when executed, cause the baseline generation and monitoring system to:
normalize the computing device activity stored in the event log; and
generate a whitelist of activities from the normalized computing device activity.

5. The system of claim 4, further comprising instructions that cause the baseline generation and monitoring system to:
analyze a data feed comprising asset inventory information to identify new assets; and
add predicted activities related to deploying the new assets to the whitelist of activities.

6. The system of claim 1, wherein the baseline is determined for at least one of: email activity, process activity, installations, register modifications, new proxy connections, new user agents, new user connections, new source authorizations, new attempted accesses, or new outbound data connections.

7. A method of detecting behavior associated with a potential security breach of an enterprise, the method comprising:
identifying, from an employee pool, an employee of the enterprise that represents an elevated risk of contributing to the potential security breach, the employee pool including a plurality of enterprise employees;
developing a plurality of use cases based on the identified employee by using a cyber-attack methodology, the cyber-attack methodology relating to a sequence of actions that are completed to prepare for a cyber-attack and to execute the cyber-attack;
providing a list of predetermined behaviors corresponding to the plurality of use cases that are indicative of the potential security breach;
determining a baseline for each of the predetermined behaviors in the list;
monitoring network activity associated with the identified employee for occurrence of any of the predetermined behaviors that exceeds the corresponding baseline; and
generating an alert when the occurrence of at least one of the predetermined behaviors is detected from the network activity.

8. The method of claim 7, further comprising storing the network activity associated with the employee in an event log.

9. The method of claim 8, further comprising:
normalizing the network activity stored in the event log that is related to the predetermined behaviors indicative of the potential security breach; and
generating a whitelist of network activities from the normalized network activity.

10. The method of claim 9, wherein monitoring the network activity associated with the employee for occurrence of any of the predetermined behaviors comprises;
monitoring the network activity; and
detecting a breach network activity related to the predetermined behaviors indicative of the potential security breach that is not included on the whitelist of network activities.

11. The method of claim 9, wherein a data feed comprised of asset inventory information is analyzed to identify new assets and predicted network activities related to deploying these new assets, and wherein the predicted network activities are added to the whitelist of network activities.

12. The method of claim 7, wherein the employee is identified based on: criticality of the employee, extra-organizational threat intelligence, and input from an organization of which the employee is a member.

13. The method of claim 7, wherein the baseline of the predetermined behaviors indicative of the potential security breach is determined for at least one of: email activity, process activity, installations, register modifications, new proxy connections, new user agents, new user connections, new source authorizations, new attempted accesses, or new outbound data connections.

14. A method of detecting behavior associated with a potential security breach of an enterprise, the method comprising:
identifying, from an employee pool, an employee of the enterprise that represents an elevated risk of contributing to the potential security breach, the employee pool including a plurality of enterprise employees;
providing a list of predetermined behaviors indicative of the potential security breach;
storing network activity of the employee in an event log;
determining a baseline for each of the predetermined behaviors in the list, the predetermined behaviors including at least one of email activity, process activity, installations, register modifications, new proxy connections, new user agents, new user connections, new source authorizations, new attempted accesses, or new outbound data connections;
generating a whitelist of network activities from the network activity;
developing a plurality of use cases based on the employee by using a cyber-attack methodology, the cyber-attack methodology relating to a sequence of actions that are completed to prepare for a cyber-attack and to execute the cyber-attack;
monitoring the network activity;
detecting a first network activity that is not included on the whitelist of network activities;
comparing the detected first network activity to the plurality of use cases;
when the detected first network activity satisfies a first use case, monitoring the network activity for a second network activity that satisfies a second use case that is related to the first use case; and generating an alert when the second network activity is detected.

15. The method of claim 14, wherein identifying an employee that represents an elevated risk of contributing to a potential security breach is determined based on criticality of the employee, extra-organizational threat intelligence, and input from an organization of which the employee is a member.

16. The method of claim 14, further comprising normalizing the network activity stored in the event log.

17. The method of claim 16, wherein the whitelist of network activities is generated by using the normalized network activity.

18. The method of claim 14, further comprising:
   analyzing a data feed comprised of asset inventory information to identify new assets; and
   adding predicted network activities related to deploying the new assets to the whitelist of network activities.

\* \* \* \* \*